(12) United States Patent
Varghese et al.

(10) Patent No.: US 11,165,735 B1
(45) Date of Patent: Nov. 2, 2021

(54) EMAIL VALIDATION

(71) Applicant: ACCENTURE GLOBAL SOLUTIONS LIMITED, Dublin (IE)

(72) Inventors: Vinu Varghese, Bangalore (IN); Anil Kumar, Bangalore (IN); Peter S. Carpenter, Chicago, IL (US); Nirav Sampat, Mumbai (IN); Balaji Janarthanam, Chennai (IN); Shikhar Srivastava, Bangalore (IN); Arun Viswanath, Bangalore (IN); Basaveswara Kiran Dumpala, Bangalore (IN); Narayan Sethi, Bangalore (IN); Elaine T. Bombal, Palatine, IL (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 17/007,885

(22) Filed: Aug. 31, 2020

(51) Int. Cl.
*G06F 15/173* (2006.01)
*H04L 12/58* (2006.01)
*G06Q 10/10* (2012.01)
*G06F 40/30* (2020.01)
*G06N 3/04* (2006.01)

(52) U.S. Cl.
CPC .............. *H04L 51/22* (2013.01); *G06F 40/30* (2020.01); *G06N 3/04* (2013.01); *G06Q 10/107* (2013.01)

(58) Field of Classification Search
CPC ........... H04L 51/22; G06F 40/30; G06N 3/04; G06G 10/107

USPC .......... 709/220, 224, 226, 228, 232
See application file for complete search history.

(56) References Cited

U.S. PATENT DOCUMENTS

| | | | |
|---|---|---|---|
| 9,047,183 B2* | 6/2015 | Shupp | G06F 11/0781 |
| 9,870,629 B2* | 1/2018 | Cardno | G06Q 10/10 |
| 9,961,028 B2* | 5/2018 | Ramsey | H04N 7/188 |
| 10,880,322 B1* | 12/2020 | Jakobsson | G06F 16/9558 |
| 11,019,076 B1* | 5/2021 | Jakobsson | H04L 51/12 |
| 11,102,244 B1* | 8/2021 | Jakobsson | H04L 51/02 |
| 2011/0252248 A1* | 10/2011 | Cameron | G06Q 10/04 713/300 |
| 2011/0261049 A1* | 10/2011 | Cardno | G06Q 10/10 345/419 |
| 2014/0075464 A1* | 3/2014 | McCrea | G16H 40/67 725/14 |
| 2021/0234820 A1* | 7/2021 | Dhawan | H04L 51/22 |
| 2021/0234870 A1* | 7/2021 | Jakobsson | H04L 63/1441 |

* cited by examiner

*Primary Examiner* — Khanh Q Dinh
(74) *Attorney, Agent, or Firm* — Mannava & Kang, P.C.

(57) ABSTRACT

Systems and methods for email validation are disclosed. The email validation includes transforming format of emails to a predefined format understandable the present system and application of text mining component on the transformed format. The email validation further includes obtaining details from a repository related to a historical pattern associated with an email validation requirement and a cognitive learning operation employed for the historical email validation to ascertain an outcome of the historical validation for similar emails. The email validation also includes predicting misdirection of the email and change in configuration of the email account based on the validation of the email.

20 Claims, 13 Drawing Sheets

Example – Input

| Client Name | ABC |
|---|---|
| Industry/Domain | Products |
| Type of Offering | Finanace & Accounting |
| Userbase | 500+ |
| Location | India, Manila, Germany, Norway |
| Sender Domain (FROM) | @accenture.com;@abc.com |

FIG. 5B

Example – Output

| | |
|---|---|
| Release Version | 2.3.0.0 |
| From | @accenture.com;@abc.com |
| Blocklisted Domain Enabled | gmaill.com; hotmail.com; rediffmail.com |
| Blocklist Domain - Mode of Exception | Enable as Error with Override |
| Blocklist Domain [Not Condition] | FALSE |
| Bypass listed Domain | @accenture.com |
| Bypass listed Email Addresses | None |
| Recipient Select All Enabled | Yes |
| Attachment Scan Enabled | Yes |
| Attachment File Size Check Enabled | Yes |
| Attachment Encryption Check Enabled | Enable as Warning |
| Graphic Scan Enabled | Disabled |
| Calender Invite Enabled | No |
| Multiple Domain Check Enabled | Yes |
| Number of Multiple domain(s) Allowed | 2 |
| Audit Log Enabled | Yes |
| Audit Log - PII Data Enabled | No |

FIG. 5C

| Client Name | Industry/Domain | Type of Offering | Configuration | Risk Score (Before) | Predicted Incidents | Probability of Incident (Before) | Recommendations | Risk Score (After) | Probability of Incident (After) |
|---|---|---|---|---|---|---|---|---|---|
| XYZ | CMT | Procurement | Config A | 50% | # Emails Sent to Blacklisted domains | 20% | Config upgrade to include Error with Override (4 Eye check) for domains | 5% | 5% |
| DEF | Product | Finance & Accounting | Config B (where Review Timer is opted) | 35% | # Emails Sent to Cross Domains | 20% | Config upgrade to include Cross Domain check | 5% | 5% |
| | | | | | # Avg. Emails Sent Time < 5 sec | 15% | Optimize the value of Review Timer | 4% | 3% |
| ABC | Product | Finance & Accounting | Config C (where Review Timer is NOT opted) | 45% | # Avg. Emails Sent Time < 5 sec | 25% | Config Upgrade to include Review Timer | 4% | 3% |

FIG. 7A

Example -

Recipients Validation
Recipient1
$Recipient1 Warnings:None.
$Recipient1 Errors:None.
$Recipient1 FourEyeCheck:None.
$Recipient1 IsPreChecked:N
Recipient2
$Recipient2 Warnings:#WarningCode=-109,#WarningMessage=Blacklisted domain.
$Recipient2 Errors:None
$Recipient2 FourEyeCheck:None
$Recipient2 IsPreChecked:N
Recipient3
$Recipient3 Warnings:#WarningCode=-105,#WarningMessage=Multiple recipient domains not allowed (To/CC).
$Recipient3 Errors:None
$Recipient3 FourEyeCheck:None
$Recipient3 IsPreChecked:N
BodyValidation
$BodyValidation Warnings:#WarningCode=-125,#WarningMessage=Body Search:- 1 Occurrences of Email Addresses found.
,#WarningCode=-125,#WarningMessage=Body Search:- 1 Occurrences of Cross Domain Validation Email Addresses found.
,#WarningCode=-125,#WarningMessage=Body Search:- 3 Occurrences of Numeric Strings found.
,#WarningCode=-125,#WarningMessage=Body Search:- 5 Occurrences of Word Search- {Invoice} found.
,#WarningCode=-125,#WarningMessage=Body Search:- 1 Occurrences of Word Search- {PO} found.

ASOC INCIDENT DB
An email sent in error from a b2b mailbox. This mailbox is used to manage communication between retailers and distributors (3rd parties). The error occurred when the end user chose the auto populated Email as the First name was matching. However, failed to check the domain.

FIG. 7B

EMAIL VALIDATION

BACKGROUND

Advancement in digital technology has led to the emergence of emails as a one of the primary modes of exchange of information. With the widespread usage of emails, incidents of misdirection of emails are also commonplace. Though usually inadvertent, such misdirected emails often amount to communication of sensitive information to unintended recipients.

Presently available tools are configured to validate emails for a specific email platform and, with a plethora of email platforms in use, the number of tools has also increased. Thus, a user communicating via different email platforms, even though through the same device, is required to employ a separate email validation tool for each platform separately. Further, configuration of the presently available email validation tools is defined manually by a user. Additionally, the presently available email validation tools confirm if the recipient is eligible to receive the email that the sender intends to send. Since a user may be unaware of the exhaustive possibilities that may lead to misdirection of the email and its content, such as sending the wrong attachment to an eligible receiver, the manual definition of the configuration may result in email misdirection. Additionally, the presently available tools lack the capability of analyzing diverse type of content in the email in the form of email attachment and email body, such as images, charts, and presentation. Thus, in a scenario where the user may activate validation of the content in the configuration, the email may nevertheless be misdirected due to lack of capability of an email validation tool.

Accordingly, a technical problem with the currently available systems for email validation is that they may be inefficient and/or inaccurate. Further, the current systems require manual configuration of email validation by a user, based on limited knowledge of the user. Thus, the current system does not provide automatic configuration. Additionally, the current systems validate email on a limited set of attributes of the email, such as recipient and size of email, and may lack the capability to validate based on other attributes, such as the content of the email and the attachment to the email.

BRIEF DESCRIPTION OF DRAWINGS

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIGS. 5B and 5C illustrate pictorial representations of a use case of email validation by implementing the email validation system for a new account, according to an example embodiment of the present disclosure.

FIGS. 7A and 7B illustrate pictorial representations of predictions by the email validation system stored in an audit log and incident database in accordance with embodiment of the present disclosure.

DETAILED DESCRIPTION

Figure 1:
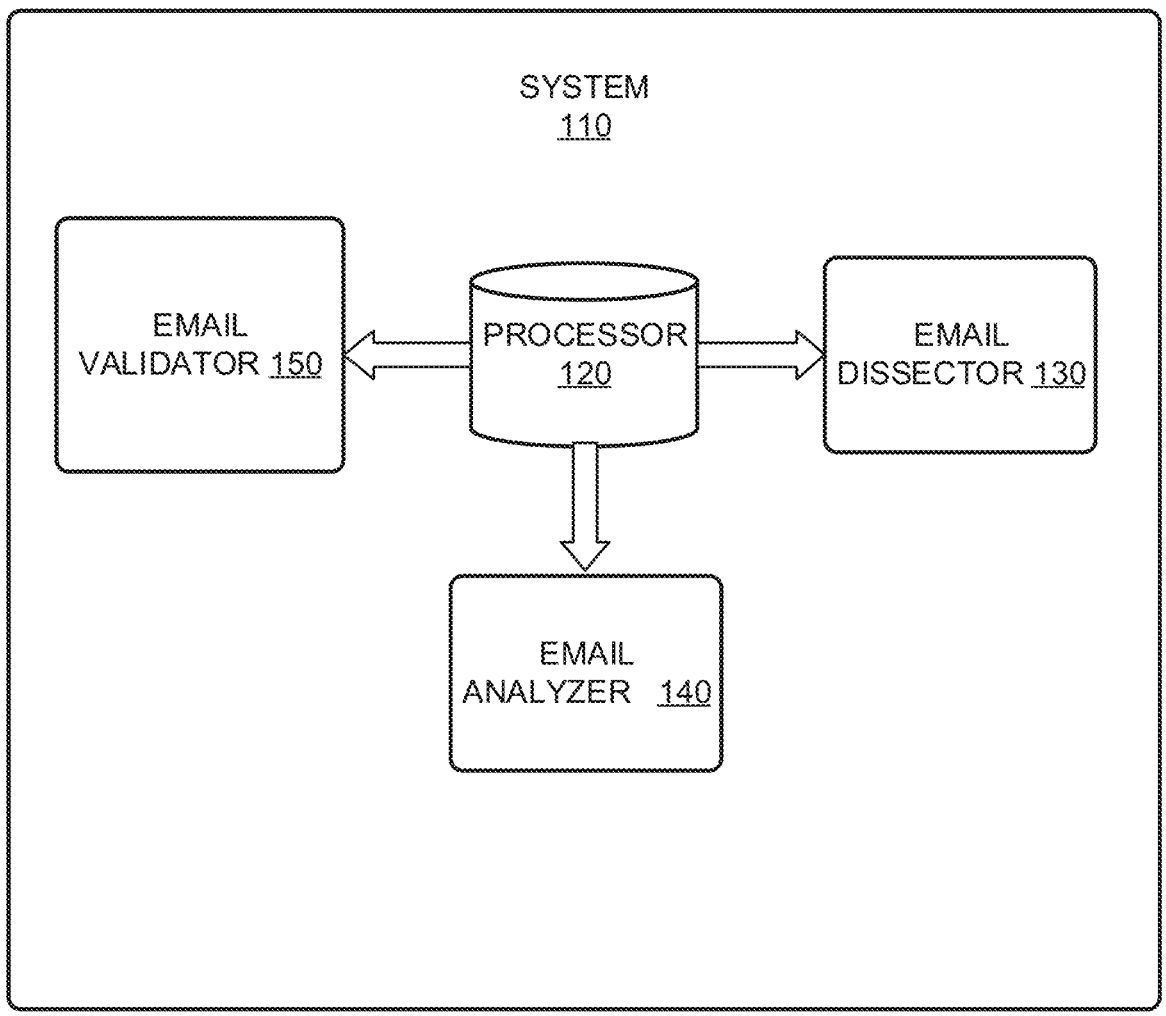
FIG. 1 illustrates a system for optimizing accuracy of valid email delivery from a source to receiver, according to an example implementation of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

The present disclosure describes a system and method for optimizing accuracy of valid email delivery from a source to receiver. The email validation system (referred to as "system" hereinafter) may be used to understand and identify anomalies associated with automatic direction of valid email. The anomalies may be referred to as misdirection of emails and may include, for example, transfer of emails to a recipient, who is not a valid recipient of the email and the content of the email.

The system may be designed to, among other things, validate the email to ensure that the email is sent to designated receiver. The system may also predict misdirection of email and identify a configuration associated with email account that may prevent the predicted misdirection. For the purpose of this disclosure, as an example, misdirection may be understood as delivery of an email to a receiver who is not a designated receiver of the email. The misdirection may be a result of direction of valid email to an invalid receiver or direction of invalid email content to a valid receiver. The email content includes the subject of the email, content in body of the email, content in attachment of the email, and the like. Further, the email configuration may be understood as properties and settings associated with the email account regarding outgoing emails and their validation. For instance, the email account may include a list of blocked email IDs for which an email can neither be received nor be sent.

The email validation system disclosed herein analyzes historical trend of email validation associated with an existing configuration of the email account and may predict if the current email that has to be sent is a valid email and if any change in configuration is required for the email account to ensure only valid emails are send out and misdirected emails are prevented. Further, neural network-based operations are automatically tuned in real-time, such that the accuracy of prediction by the present disclosure is enhanced.

The system may include a processor, an email dissector, an email analyzer, and an email validator. The processor may be coupled to the email dissector, the email analyzer and the email validator. The email dissector may receive a request along with an email from a user. The request may be indicative of validation requirement for the email. Further, the email dissector may identify an attribute of the email by employing a text mining component on the received email.

The email analyzer may obtain details from a repository related to a historical pattern associated with email validation requirement and cognitive learning operation employed for the historical email validation. The historical email validation requirement may be understood as historical requests for validating emails and results of the validations associated with them, whereas the historical cognitive learning operation may be understood as cognitive leaning operation employed for validation of the email for historical requests for email validation. The email analyzer may also analyze the identified property of the email along with the historical pattern and the cognitive learning operation obtained by employing an artificial intelligence (AI) component.

Additionally, the email validator may validate the email based on the analysis by the AI component by determining similarity between the outcome of the historical validation for the email and the email to be validated.

The embodiments for the email validation presented herein are exemplary in nature and should be treated as such. For the sake of brevity and technical clarity, the description of the email validation system may be restricted to few exemplary embodiments, however, to a person of ordinary skill in the art, it should be clear that the system may be used for the fulfillment of various email validation other than those mentioned hereinafter.

Accordingly, the present disclosure aims to provide a system for email validation that may predict if the intended email may be misdirected. Further, the system also predicts changes to configuration of email account to reduce probability of misdirection. Also, the present disclosure ensures effectiveness, efficiency, and accuracy in validation of emails. The present disclosure provides an email validation system which is agnostic of the emailing platform that is being used and the email validation system may, therefore, be used as a unified email validation tool by a user. In addition, the email validation system obviates manual defining of configuration(s) for email validation by a user based on historical misdirection data with the user without requiring considerably amounts of such historical data. Further, the disclosed email validation system has a capability of validating email based on content of the email.

FIG. 1 illustrates a system 110 for optimizing accuracy of valid email delivery from a source to receiver (referred to as system 110 hereinafter), according to an example implementation of the present disclosure. In an example, the system 110 may include a processor 120. The processor 120 may be coupled to the email dissector 130, the email analyzer 140, and the email validator 150.

The email dissector 130 may receive a request along with an email from a user, the email being intended to be sent to a receiver. The request may indicate validation requirement for the email. In an exemplary embodiment of the present disclosure, the email may be associated with an email account generated on an email platform. For example, the email account may be an account on Gmail, outlook, yahoo and the like. In an embodiment of the present disclosure, the email account may send the email using an online browser, such as Hyper Text Markup Language (HTML)-based browser. In another embodiment of the present disclosure, the email account may send the email using an on-device platform, such as mobile application.

Further, the email account may be associated with the system 110 for email validation. In an embodiment of the present disclosure, the email account may be associated with an existing user or client of the system 110. In another embodiment of the present disclosure, the email account may be associated with a new user or client of the system 110. The email account of a new user or client may be understood as an email account for which the system 110, disclosed by the present disclosure does not have historical data as the email account is using the system 110 for the first time. On the other hand, the email account of the existing user or client may be understood as an email account that has at previous instances used the system 110.

The email dissector 130, after receiving the request for validation, may identify an attribute of the email. The attribute of the email may be understood as properties of the email, such as receiver of the email, sender of the email, subject of the email, content of the body of the email, type of attachment in the email, and content of attachment in the email. Thus, the attributes of the email represent identity of the email. The email dissector 130 may employ a text mining component on the received email to identify the attributes of the email.

Further, the email analyzer 140 is configured to determine if historically an email with the attributes similar to the identified attributes of email fora similar email account was directed appropriately or if it was misdirected. The similarity of the email account may be determined based on configuration of the email account associated with email validation and the system 110.

For determining if an email validation request similar to the one presented by the user in present instance has been made historically, the email analyzer 140 may obtain details related to a historical pattern associated with email validation requirement and cognitive learning operation employed for the historical email validation. The details may be obtained from a repository, such as a database of historical data. In an embodiment of the present disclosure, the repository may be provided as cloud storage, while in another embodiment of the present disclosure, the repository may be embedded with the system 110.

The email analyzer 140 may also analyze the identified property of the email based on the historical pattern and the cognitive learning operation. In an example, the cognitive learning operation may involve employing an AI component. The email analyzer, in the manner elucidated further, determines that an email with the identified property has been validated based on historical pattern by the AI component. The email analyzer 140 may further ascertain outcome of the historical validation for the previously sent email by the AI component.

The email validator 150 may validate the email based on the analysis by the AI component by determining similarity between the outcome of the historical validation for the email and the email to be validated. Further, upon completion of email validation, the email validator 150 is to predict change, for example, required, to the existing configuration of the email account and predict misdirection incident for emails associated with the associated with the existing configuration by providing a prompt to the user with changes to the configuration and logging the email validation for subsequent validation scenarios.

To explain by way of an example, the email account may have a configuration that an email from the email account "A" to receiver "B" should not include a chart in email body. Therefore, in case "A" sends an email to "B" with a pie-chart in the email body, the email may be considered as misdirected based on configuration of the email account. In another example, receiver "B" may be blocked or deblock listed by sender "A". Therefore, in case an email is sent from "A" to "B," it may be considered as misdirected email based on the configuration of the email account.

Figure 2:
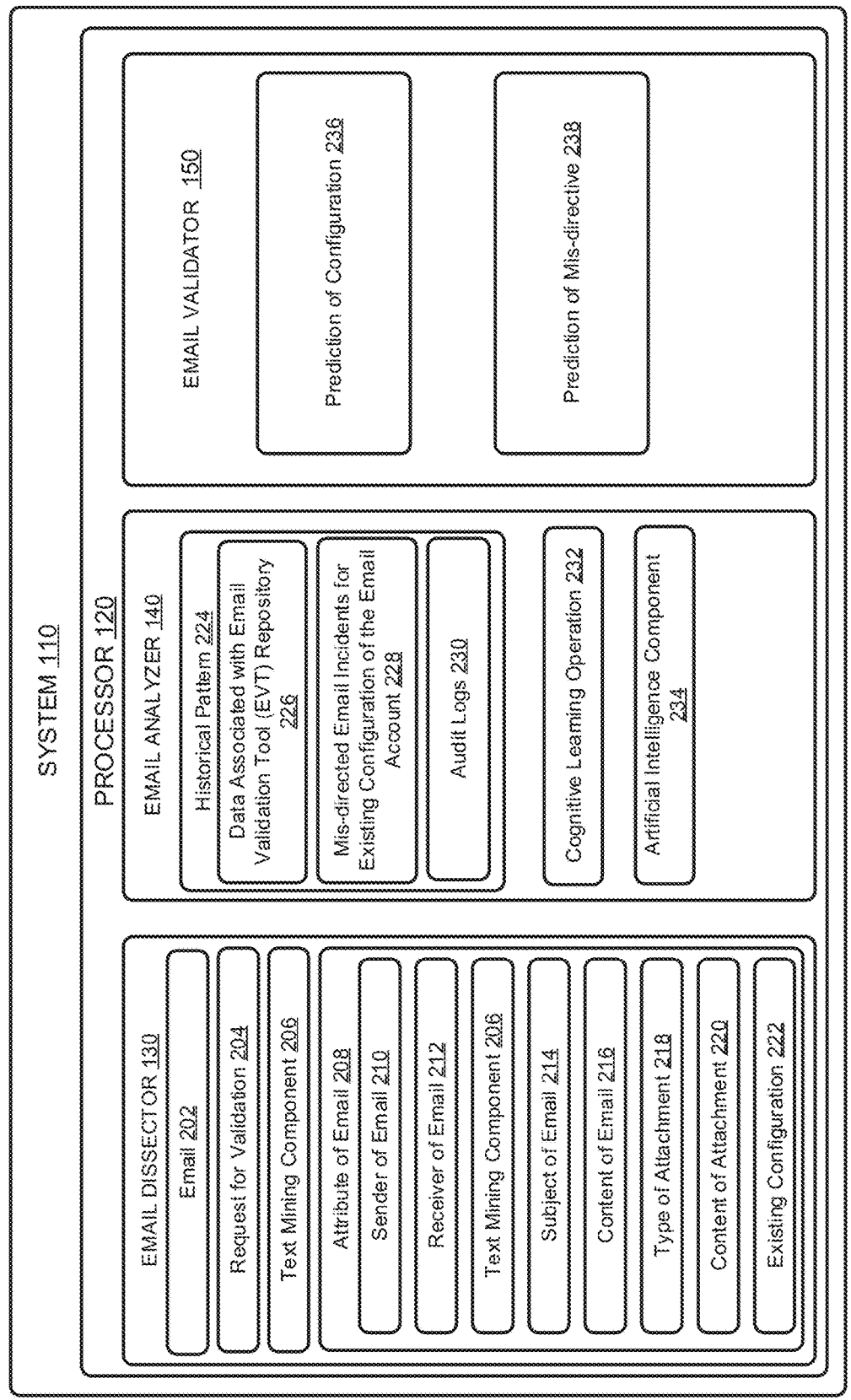
FIG. 2 illustrates various components of the email validation system, according to an example embodiment of the present disclosure.

FIG. 2 illustrates various components of the email validation system 110, according to an example embodiment of the present disclosure. In an example, the system 110 may include a processor 120. The processor 120 may be coupled to the email dissector 130, the email analyzer 140 and the email validator 150.

An email 202 along with a request for validation 204 may be received by the email dissector 130. The request may indicate validation requirement for the email. Further, the user may intend to send the email to a receiver. In an exemplary embodiment of the present disclosure, the email may be associated with an email account generated on an email platform. For example, the email account may be account on Gmail, outlook, yahoo and the like. In an embodiment of the present disclosure, the email account may send the email using an online browser, such as HTML based browser. In another embodiment of the present disclosure, the email account may send the email using an on-device platform, such as mobile application.

Further, the email account may be associated with the system 110 for email validation. Furthermore, the email account may be associated with an existing user or client of the system 110 or a new user or client of the system 110. The email account of a new user may be understood as an email account for which the system 110 does not have historical data as the email account is using the system 110 for the first time. Additionally, the email account of the existing user or client may be understood as an email account that has at previous instances used the system 110.

After receiving the request for validation, the email dissector 130 may identify an attribute of the email 208. The attribute of the email may be understood as properties of the email, such as the attribute of the email includes sender of the email 210, receiver of the email 212, subject of the email 214, content in body 216 of the email, type of attachment in the email 218, content in the attachment of the email 220, and existing configuration 222 of email account associated with the received email. Thus, the attributes 208 of the email represent identity of the email. The email dissector 130 may employ a text mining component 206 on the received email to identify the attributes of the email.

Furthermore, the email dissector 130 may identify a source model of email provider of the email received for the identification of the attribute of the email 208. The dissector 130 may further transform the identified source model to an email model in a predefined format associated with the email analyzer 140. The email providers may be understood as various email platforms such as, Gmail, outlook, and yahoo. Since source model for each platform is unique, the email analyzer 140 may have to analyze email from each platform differently, amounting to additional effort, cost and complexity in processing. Accordingly, to avoid such expense of time and resources, the email dissector 130 transforms the source model of each email provider to a universal source model in a predefined format, so that the email analyzer 140 may only have to analyze the universal source model.

For example, the source model for Gmail may be in Hyper Text Markup Language (HTML) format and the predefined format understood by the email analyzer 140 may be JavaScript Object Notation (JSON) and the predefined format can be agnostic to the platform associated with the email. In other words, irrespective of the platform, such as a web-based platform, associated with the email, the source model can be transformed into the JSON format. Therefore, in a scenario the email is sent through Gmail or through Microsoft® Exchange service, the source code of the email may be transformed to JSON format, so that the email analyzer 140 may easily analyze the email and the email dissector 130 may extract attributes of the email. As one example, the source code of the email may be transformed to the JSON format by a customized Python script. Further, after the email source code is transformed to the predefined format, the text mining component 206 may be applied to the email source code in the predefined format of the email to identify the attribute from the email model. The text mining component 206 use the technique of Natural Language Processing.

As elaborated above, the email analyzer 140 may be configured to determine if historically an email with the attributes similar to the identified attributes of email was directed appropriately or if it was misdirected for a similar email account. The similarity of the email account may be based on configuration of the email account associated with email validation and the system 110. The email analyzer 140 may obtain details related to a historical pattern 224 associated with email validation requirement and the cognitive learning operation 232 employed for the historical email validation. The details may be obtained from a repository, such as a cloud-based database or a locally available database on the system 110.

The historical pattern 224 and the cognitive learning operation 232 may include data associated with Email validation tool (EVT) repository 226, misdirected email incidents for existing configuration of the email account 228, and audit logs 230 indicative of usage pattern of the existing email account user. The historical pattern 224 may be understood as historical data associated with validation of emails from email accounts having configuration similar to existing configuration of the email account.

Further, the cognitive learning operation 232 may be understood as historical data related to the cognitive learning operation 232 and the AI component 234 that have been used for the email validation for email accounts having configuration similar to existing configuration of the email account. Further, the data for the cognitive learning operation 232 is indicative of AI component 234 employed for the existing configuration of the email account.

In an embodiment of the present disclosure, the audit logs 230 may be considered in case of existing account, as the audit logs capture data related to usage pattern of the existing account. The audit logs 230 may be understood as historical activity pattern for the current email account to capture pattern of usage and email validation for the email account. In another embodiment of the present disclosure, if the email account belongs to a new client historical pattern and cognitive learning operation 232 are extracted with respect to email accounts with similar configuration as that of the email account.

The identified property of the email may be analyzed by the email analyzer 140 along with the historical pattern 224 and the cognitive learning operation 232 by employing an AI component 234 and determine that an email with the identified property has been validated based on historical pattern 224 by the AI component 234. The email analyzer 140 may further ascertain outcome of the historical validation for the previously sent email by the AI component 234.

Further, upon determination of the similarity by the email analyzer 140, the email validator 150 validates the email, based on the analysis by the AI component 234. In an embodiment of the present invention, the email validator 150 may determine in real-time the AI component with an AI model most accurate to predict email misdirection and configuration of the email account.

The determination of the most accurate AI model includes defining boundary parameters for analyzing and classifying an AI operation as most accurate prediction operation. Subsequently, three Neural Network (NN) models or AI models with different architecture may be generated dynamically. Further, activation function and loss for output from the Neural Network models may be defined. In an example embodiment of the present disclosure, after a predefined number of iterations, the verification of the accuracy is performed. If the accuracy of one of the Neural Network models is determined to be more than or equal to the boundary value of the accuracy, further verification of the Neural Network models is stopped and that Neural Network model is selected and employed for prediction to display results of prediction to the user.

In turn, using the Neural Network model so selected and employed, the email validator 150 predicts change to the existing configuration of the email account and predict misdirection incident for emails associated with the associated with the existing configuration by providing a prompt to the user with changes to the configuration and logging the email validation for subsequent validation scenarios. For example, the email account may have a configuration that an email from the email account "A" to receiver "B" should not include an excel as an attachment. Therefore, in case "A" sends an email to "B" with an excel workbook as an attachment, the email may be considered as misdirected based on configuration of the email account. In another example, receiver "B" may be blocked or block listed by sender "A". Therefore, in case an email is sent from "A" to "B" it may be considered as misdirected email based on the configuration of the email account.

In operation, the system 110 may be used to validate emails. A user, client of the email validation system 110, may draft an email and send it. Upon user sending the email and before forwarding the email for delivery, the email dissector 130 receives the email along with a request for email validation. Further, the email dissector 130 identifies an attribute of the email 208. For identification of the attribute the email dissection 130 may obtain a source code or model of the email platform or provider through which the email is sent.

The email dissector 130 then identifies source model for the email provider and the source model for the specific email is converted to a predefined format that the email dissector 130 and the email analyzer 140 understand. Therefore, the source model of the email from one computer language is converted to source code in the language that the email dissector 130 and the email analyzer 140 understand. Subsequently, the email dissector 130 may apply natural language processing on the source model in the predefined format to obtain attributes of the email 208, such as sender 210, receiver 212, content of subject line 214, content of body 216, and content of attachment 220.

Further, the email analyzer 140 checks existing configuration of the email account. The configuration may be indicative of features of the email validation system 110 that the user has enabled. For example, the user might have only opted that the system 110 may check if the recipient is part of blocked contact list. Additionally, in parallel the system 110 checks for historical data associated with similar account in terms of type of user and its configuration, to check if previously there has been an error in email sent from similar account with similar configuration. Further, pattern of the current user is also captured by way of audit log 230. Additionally, the system 110 may determine type of configuration that historically have proven to be less prone to email misdirection.

Subsequently, based on existing configuration opted by the user and the historical data analyzed by the email validator 150 in parallel, it is ascertained if there is a probability of misdirection of the present email i.e. prediction of email misdirection 238. The email validator 150 may also predict if with the current configuration there is a probability of misdirection in future and accordingly assists user in updating or correcting the email configuration. In case it is determined that the current email is also misdirected, the email validator 150 does not send the mail and prompts same to the user.

Accordingly, the present disclosure aims to provide a system 110 for email validation that may predict whether the intended email may be misdirected and also facilitates in actively preventing such misdirected emails. Further, the system 110 also predicts changes to configuration of email account to reduce probability of misdirection. The embodiments presented for the system 110 herein may be only provided as examples and the same should be clear to a person skilled in the art.

Figure 3:
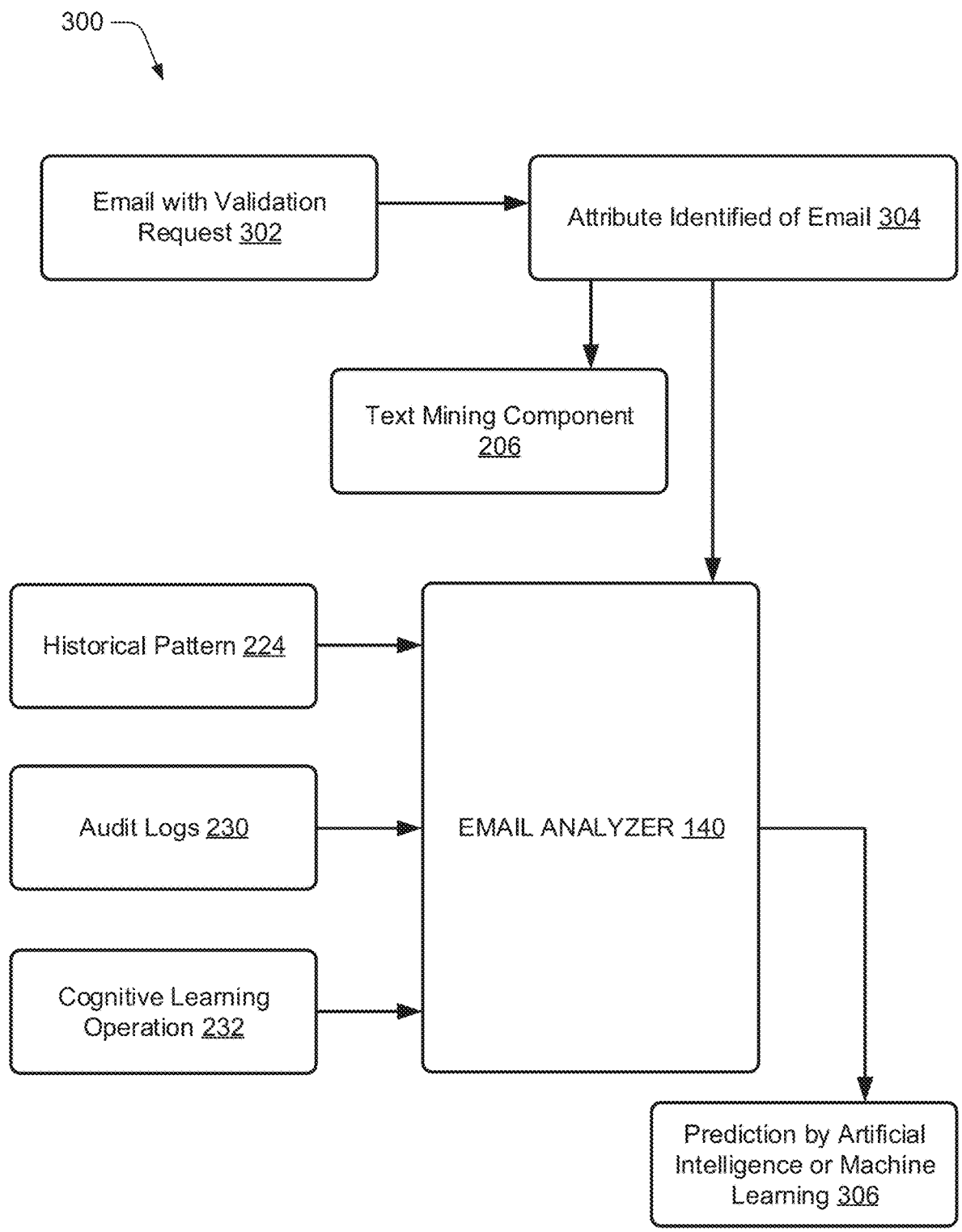
FIG. 3 illustrates a flow diagram for an approach of implementing the email validation system, according to an example embodiment of the present disclosure.

FIG. 3 illustrates a flow diagram 300 for an approach of implementing the email validation system 110, according to an example embodiment of the present disclosure. The components described above by way of FIGS. 1-2 may be referred to for understanding the flow diagram 300 for implementing the email validation. The email validation may be understood as a process to ensure accuracy of valid email delivery from a source to receiver without any misdirections.

As explained, for email validation, an email with a validation request is received by the email dissector 130. The email dissector 130 may identify the source model of the email and transform the source model to an email source model in a predefined format that the system 110 and its components understand. Subsequently, a text mining component may be employed on the transformed source model to obtain attributes of the email, as elaborated in FIGS. 1 and 2. In an implementation of the present disclosure, the text mining component may use techniques, such as tokenization, lower casting, stop words removal, stemming, and lemmatization for identifying attributes. The identified attributes are provided to the email analyzer 140 by the email dissector 130.

Further, it may be ascertained if the email account belongs to an existing client or a new client. In an embodiment of the present disclosure, if the email account belongs to an existing client, historical pattern, audit logs and cognitive learning operation are extracted with respect to email accounts with similar configuration as that of the email account. The historical pattern may be understood as historical data associated with validation of emails from email accounts having configuration similar to existing configuration of the email account. Further, the cognitive learning operation may be understood as historical data related to cognitive learning operation, the analysis performed by the AI components for the email validation for email accounts having configuration similar to existing configuration of the email account. Additionally, the audit logs may be understood as historical activity pattern for the current email account to capture pattern of usage and email validation for the email account.

In another embodiment of the present disclosure, if the email account belongs to a new client, the historical pattern and the cognitive learning operation are extracted with respect to email accounts with similar configuration as that of the new client's email account.

The historical pattern, audit logs, and the cognitive learning operation are provided to the email analyzer 140 along with the identified attribute of the email. The email analyzer 140 may analyses the identified attributes in view of the historical pattern, audit logs, and cognitive learning operation to categorically determine similarity between the email and the validation request associated therewith, with the historical emails and their respective validations along with success of the validations.

For the purpose of determining the similarity, the email analyzer 140 captures configuration of the email account of the sender along with the identified attributes, and also captures usage pattern of the email account i.e. audit logs data, historical pattern of email accounts having similar configuration and belonging to similar industry and domain with respect to email validation requests and also cognitive learning operation related data, specifying which neural network operation was used for previous email validations of email accounts with similar configuration. The data related to the email from the email account of the sender and data from the audit logs, the historical pattern and cognitive learning operation is referred as "captured data".

The captured data may be pre-processed by the email analyzer 140 by employing techniques, such as term frequency-inverse document frequency (TF-IDF) technique, word embedding Named-entity recognition (NER), dependency parsing techniques, Part-of-speech (POS) Tagging, OneHotEncoding (OHE), and label encoding. As a result of the pre-processing, an overlap between the previous email validation requests and the current email validation request is determined. In an exemplary embodiment of the present disclosure, the AI component may be employed by the email analyzer 140 for the determination of the similarity.

The result of the determination may be provided to the email validator 150. The email validator 150 may be associated with the dynamic Auto Generative Neural Network, i.e., the AI (AI) component, as disclosed in FIGS. 1-2, that receives the data from the email analyzer 140 for prediction of misdirection and configuration for the email account and determines as to which AI operation or model may be most appropriate in terms of, for instance, accuracy, for prediction for the data. After identification of the suitable AI operation, the dynamic Auto Generative Neural Network tunes the identified AI operation to provide accurate predictions. Thus, the identification of the suitable AI operation and the tuning of the same may be executed in real-time based on the incoming data relating to the email and the related account, amounting to enhanced accuracy in prediction of misdirection of email and configuration of email account, each time.

The dynamic Auto Generative Neural Network may be improved based on self-learning in each cycle of validation of the email validation system 300. The dynamic Auto Generative Neural Network is trained by providing the pre-processed data from the email analyzer 140 to the email validator 150, and to three different type of neural network architectures with a first set of hyper parameters. In an example, for first five iterations, different hyper parameters can be applied on the three different neural network architectures, and for the further iterations, the most appropriate Neural network architecture can be selected from among the three architectures and the different hyper parameters can be applied to it.

The three type of neural network architectures may be, without limitation, shallow neural network, convolutional neural network, and deep neural network. Further, the hyper parameters may be understood as architectural properties of the neural network architectures, such as learning rate, type of activation function, number of hidden units for each hidden layer, and batch normalization.

The three neural networks process the data and provide an outcome of the validation request. The outcome may be indicative of probability that the email may be misdirected, probable updating to the email accounts' configuration that may prevent the misdirection in future, and reduction in probability of the misdirection with the use of the recommended configuration. Further, the outcome from each neural network from the three neural networks is checked to determine accuracy of the outcome with respect to the email validation.

This process of obtaining outcome from each neural network with the first set of hyper parameters is repeated for a predetermined number of iterations. Then a second set of hyper parameters are applied to the same data to obtain the output. The accuracy of prediction for each iteration is recorded and it is determined as to which of the three neural network architecture provides the most accurate prediction. The most accurate neural network is then employed for the prediction of the misdirection and the configuration.

The trained dynamic Auto Generative Neural Network, during operation, re-checks as to which of the three neural network models or architectures provides the most accurate result even in run-time. However, with the use of the learning from previous iterations and the training provided earlier, the number of iterations for determination of the accuracy of the neural network architectures is considerably reduced.

The operation of the dynamic Auto Generative Neural Network during the real-time validation may include defining boundary parameters for analyzing and classifying an AI operation as most accurate prediction operation. The boundary parameters may be defined based on learning from previous iterations and the training. For example, upper number of iterations to determine accuracy may be 30. Further, the base accuracy of prediction may be 85%.

Subsequently, the three Neural Network (NN) or AI operations with different architecture may be verified, as explained above. In an exemplary embodiment of the present disclosure, after a predefined number of iterations the verification of the accuracy is carried out. Further, in case, the accuracy of one of the Neural Network is determined to be more than or equal to the boundary value of the accuracy, further verification of the Neural Networks is stopped, and the Neural Network is employed for prediction to display result of prediction to the user.

Further, an activation function and loss for output from the Neural Network may be defined for determining the accuracy of the neural networks. In an example of the present disclosure, the activation function may be a Soft Max function and the loss may be determined by Categorical cross entropy function defined below:

Soft Max Function:

The standard (unit) Soft Max function σ: $R^k \rightarrow R^k$ is defined by the formula:

$$\sigma(z)_i = \frac{e^{z_i}}{\sum_{j=1}^{K} e^{z_j}} \text{ for } i = 1, \ldots K \text{ and } z = (z_1, \ldots, z_k) \in R^K \quad (1)$$

Categorical Cross Entropy Function:

If M>2 (i.e., multiclass classification), a separate loss for each class label per observation and sum the result is calculated.

$$-\sum_{c=1}^{M} y_{o,c} \log(p_{o,c}) \quad (2)$$

Where, M is a number of classes (dog, cat, fish), log is natural log, y is binary indicator (0 or 1) if class label c is the correct classification for observation o, and p is predicted probability observation o of class c.

Further, all the architectures of the Neural Networks, the iterations, and outcomes are stored in a database, as mentioned above. The self-learning capability of the dynamic Auto Generative Neural Network may be built using the database, so that only best performing architecture and the most appropriate parameter may be dynamically generated based on all iteration or execution results, which may learn email validation domain and solve comprehensively prediction of email account configuration and misdirected Incidents.

Figure 4A:
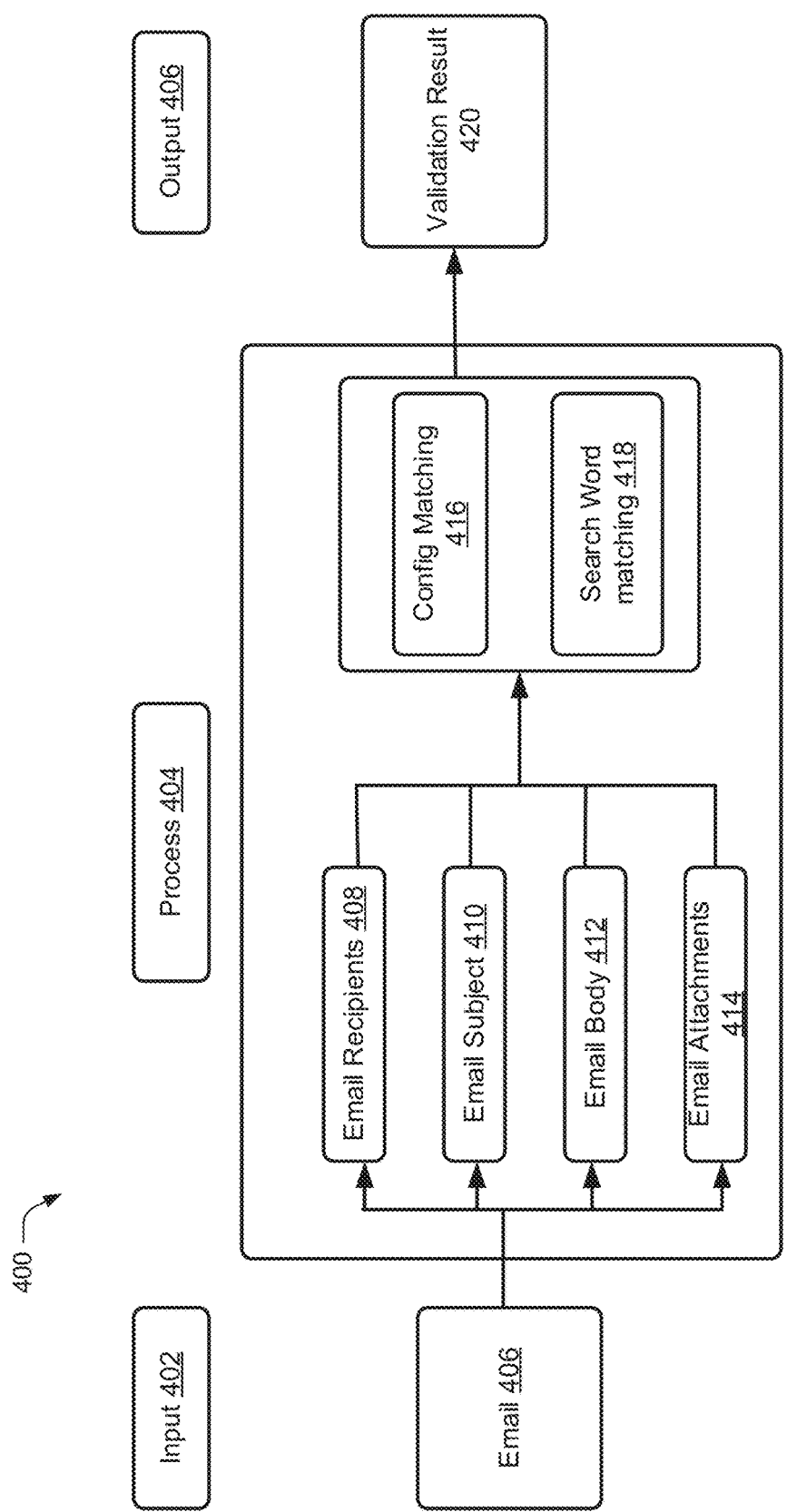
FIG. 4A illustrates a flow diagram for process of email validation by the email validation system, according to an example embodiment of the present disclosure.

FIG. 4A illustrates a flow diagram 400 for process of email validation by the email validation system 110, according to an example embodiment of the present disclosure. The components described above by way of FIGS. 1-3 may be used for carrying out the email validation process 400. As illustrated, an email 406 may be received as an input to the email validation system 110. The email 406 may be provided to processing components 404 of the email validation system 110. As explained in FIGS. 1-3, the email 406 may be understood as an email with an email validation request. As a part of the processing of the email 406, different attributes of email 406 may be extracted by text mining component, disclosed above.

The attributes may be email recipients 408, email subject 410, email body 412 and email attachments 414. Further, the extracted attributes of the email 406 may be processed by applying configuration matching 416 and search word matching 418. In an exemplary embodiment of the present invention, the processed by applying configuration matching 416 and search word matching 418 may be executed by using AI component and historical data, elaborated in FIGS. 1-3. Further, the processing of the attributes may provide a validated result 420 as an output 406. The validated result 420 may be indicative of email misdirection and configuration of email account related predictions, as elaborated in FIG. 1-3.

Figure 4B:
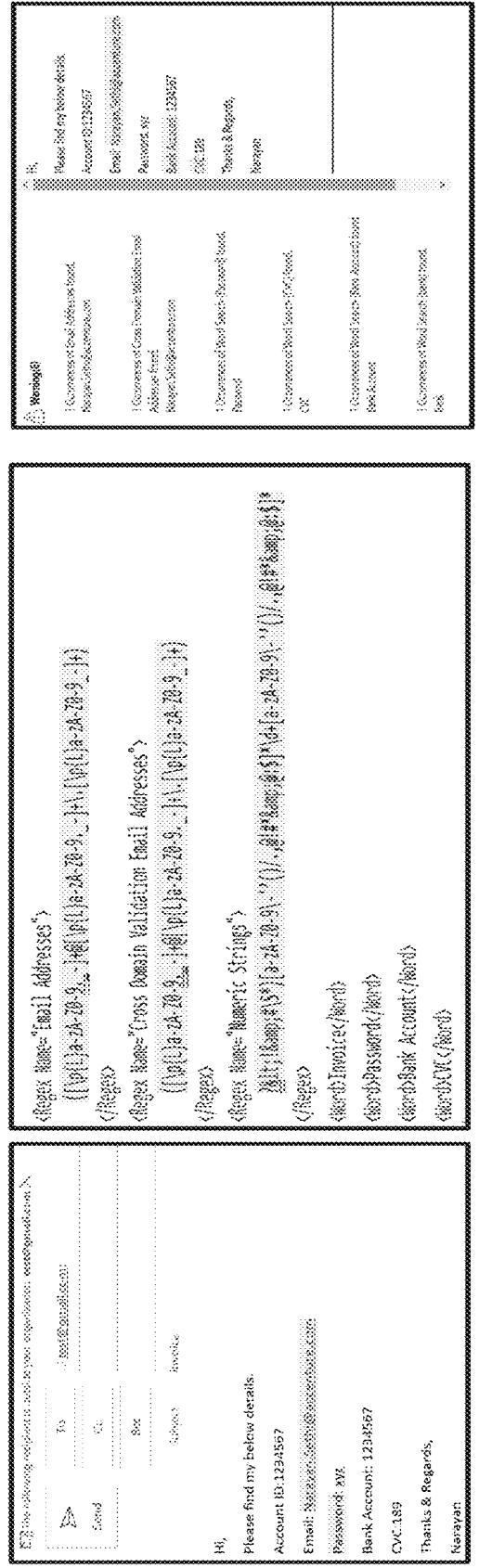
FIG. 4B illustrates a pictorial representation of a use case of email validation by implementing the email validation system, according to an example embodiment of the present disclosure.

FIG. 4B illustrates pictorial representation of a use case scenario of email validation by implementing the email validation system 110, according to an example embodiment of the present disclosure. The components described above by way of FIGS. 1-4A may be used for carrying out the email validation process 400.

As shown in FIG. 4B, an email may be received by the system 110. In the input 402, the sender of the email is Narayan.Sethi@accenture.com, the recipient of the email is test@gmail.com, the subject of the email is invoice, the content of the body includes account ID, email ID, password, bank account number, and Card Verification Code (CVC) number. Further, the email may be in a source code of a certain domain, such as www.accenture.com.

The email may be received by the email dissector 130 and the abovementioned attributes of the email may be obtained by the email dissector 130 by converting the source code to email source code in the pre-defined format. Subsequently, text mining component may be implemented on the source code in the predefined format, as shown in the process 404. Thus, the process 404 identifies email recipients, email subject, email body and the email attachments.

The process 404 may involve implementing configuration matching and search word matching by employing AI component by the email analyzer 140. The outcome of the configuration matching and search word matching may be provided to the email validator 150 employing the dynamic Auto Generative Neural Network, elaborated in FIG. 3. The email validator 150 may then provide validation result 420 as an output 406.

As shown in the output 406, the validation results 420 may be that the receiver and the sender of the email belong to different email domains. Additionally, the content of the email body includes confidential details such as, bank account details, CVC number and password. Thus, the validation results 420 prompts warnings that based on the factors displayed the email might be misdirected and the user should reconsider sending out the email. In an exemplary embodiment, the validation results 420 may also display to the user changes to the existing configuration to ensure probability of misdirection is reduced. For example, with respect to the input 402, the user may define a rule with the system 110 that emails to a domain different from the domain of the sender should be blocked.

Figure 5A:
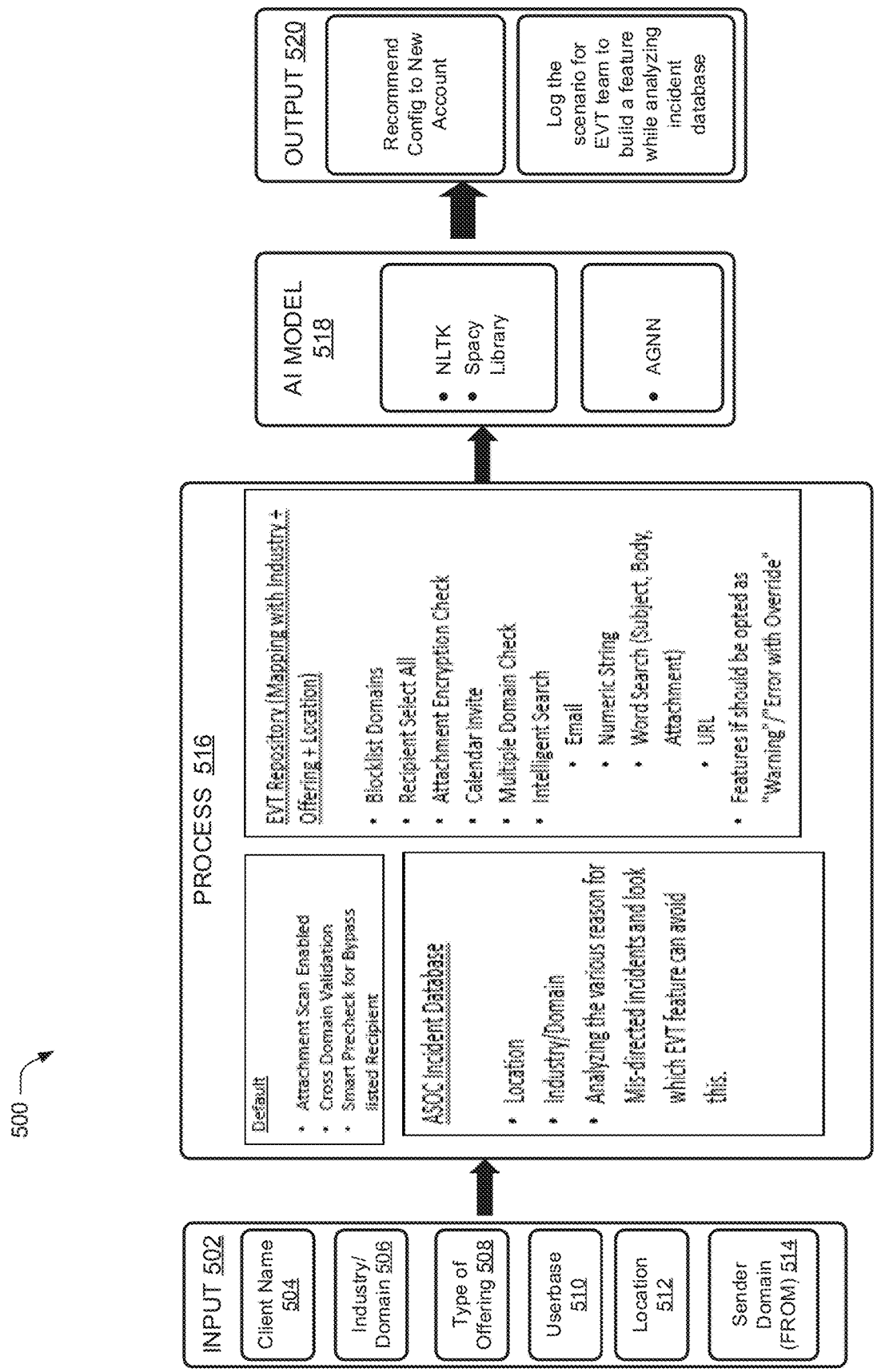
FIG. 5A illustrates a block diagram for email validation process by the email validation system for a new account in accordance with an embodiment of the present disclosure.

FIG. 5A illustrates a block diagram for email validation process 500 by the email validation system 110 for a new account in accordance with an embodiment of the present disclosure. The components described above by way of FIGS. 1-4A may be used for carrying out the email validation process 500.

As shown in FIG. 5A, the system 110 may receive input 502 for validation of email. The input 502 may be received from the email dissector 130 and may include the attributes of the email. Identification of the attributes i.e. input 502 by the email dissector 130 has already been elaborated in description of FIGS. 1-4B.

As shown in FIG. 5A, the input 502 may include, without any limitation, client name 504, industry or domain 506, type of offering 508, userbase 510, location 512, and sender domain (from) 514. Further, the input 502 may be processed by the email analyzer 140, which is depicted in detail as process 516 in FIG. 5A. As shown, the processing of the input 502 is executed in multiple types, such as default, incident database-based, and email validation repository-based. The types of the process 516 may be dependent on existing configuration of the email validation system 110. In the default processing, attachments of the email may be scanned, it may be validated if emails across different domains may be exchanged, and recipient of the email may be identified as belonging to bypass list i.e. allowable recipient.

Further, the incident-based database may be understood as a historical database of misdirection of emails for similar accounts i.e. accounts having similar configuration and belonging to similar industry. For example, in case the email to be validated is sent from a software solution provider based out in a metropolitan of India, the incident database may be a database of previous misdirection incidents associated with software solution providers based out in a metropolitan of India.

Furthermore, the email validation repository-based may be repository of parameters or configuration of the system 110 that may be of significance in validation process for to similar accounts as the account sending the email. For example, based on industry, service offering and the location, the configuration of the email account may be to check for blocklist domains, recipients, encryption of the attachment, calendar invite, multiple domain check, search of email content and feature to display only a warning or error with override, which is also illustrated and discussed later with respect to FIG. 5B.

Subsequently, the AI model 518 may be employed on the processed data to obtain the output 520. The AI model 518 may include application of the dynamic Auto Generative Neural Network (AGNN), elaborated above, and without any limitation, tools such as Natural Language Toolkit (NLTK) or Spacy Library. Further, as illustrated the output 520 may include prediction of changes to configuration of the email account. Further, the output 520 along with the input 502 and the process 516 may be logged in the incident database for future references.

FIGS. 5B and 5C illustrate pictorial representations of a use case scenario of email validation by implementing the email validation system 110 for a new account, according to an example embodiment of the present disclosure. The components described above by way of FIGS. 1-5A may be used for carrying out the email validation process 500. FIG. 5B illustrates the attributes of the email in accordance with an exemplary embodiment of the present disclosure. The attributes may correspond to the input 502, illustrated in FIG. 5A. As shown, the attribute client name may be ABC, industry or domain may be products, type of offering may be finance and accounting, userbase may be 500 plus, location may be India, Manila, Germany, Norway, and the sender domain (from) may be @accenture.com and @abc.com.

Further, FIG. 5C illustrates an example of the output 520, as shown in FIG. 5A, in accordance with an embodiment of the present disclosure. The output 520 may correspond to attributes of the input 502. As shown in FIG. 5C, details related to current configuration of the email account regarding email validation may be that the release version of the email validation system 110 in use is 2.3.0.0. Further, the email may be sent from domain accenture.com or abc.com. Also, blocking of domains gmail.com, Hotmail.com and rediffmail.com is enabled, and bypass listing of domain Accenture.com is enabled, such that email domain may be checked during email validation, to ascertain is email is directed to a bypass listed domain or block listed domain.

Further, there is recommendation that email to the block listed mails should be allowed to be sent by giving an error stating that the email may be misdirected as it is being sent to a block listed domain. Furthermore, override of the error may be provided to the sender. Additionally, sending of the email to blocklist domain without any error may be disabled. Also, if no email address is bypass listed, validation for all recipients may be enabled, scan of attachment may be enabled, checking of file size of the attachment may be enabled, check of encryption of the attachment with error may be enabled, scan of the graphics in the email body may be enabled, calendar invite may be enabled, multiple domain check may be enabled, and audit log may be enabled.

Figure 6:
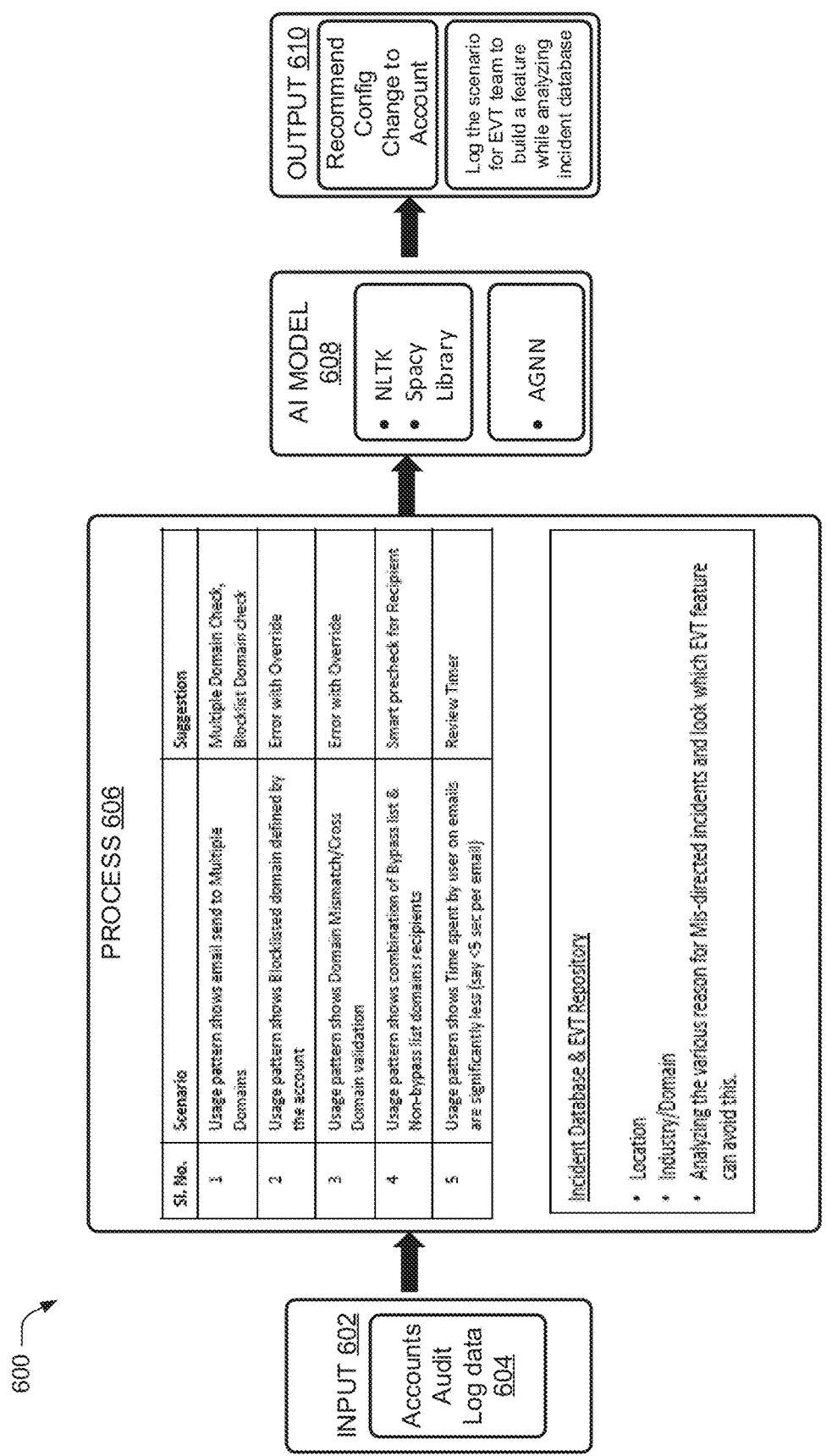
FIG. 6 illustrates a block diagram for email validation process by the email validation system for an existing account in accordance with an embodiment of the present disclosure.

FIG. 6 illustrates a block diagram for email validation process 600 by the email validation system 110 for an existing account in accordance with an embodiment of the present disclosure. The components described above by way of FIGS. 1-5 may be used for carrying out the email validation process 600.

As shown in FIG. 6, the system 110 may receive input 602 for validation of email. The input 602 may be a combination of input 502 elaborated in FIG. 5A and audit log data 604, elaborated above. Further, the input 602 may be processed by the email analyzer 140. Process 606 in FIG. 6 illustrates the processing of the input 602. As shown, the processing of the input 602 is executed in multiple types, such as incident database based and historic scenario-based suggestions.

As shown in FIG. 6, in scenario 1, where the historical usage pattern is that email is sent to multiple domains, the suggested configuration is to check if email is being sent to multiple domains and if any of the domains that the email is being sent to is a block listed domain. In scenario 2, where the historical usage pattern is that block listed domain is defined by the email account, i.e., if a particular domain is block listed for an email and bypass listed for another at the discretion of the user, the suggestion may be presenting an error of probable misdirection and allowing email to be sent by override.

In scenario 3, where the historical usage pattern is domain mismatch or cross domain validation, the suggestion may be presenting an error of probable misdirection and allowing email to be sent by override. In scenario 4, wherein the historical usage pattern is that email may be sent to a combination of bypass listed and block listed domain, the suggestion may be performing a smart precheck for verifying which recipient is bypass listed and which is not. In scenario 5, where the historical usage pattern is that a user spends very less time for sending out email, the suggestion may be enabling a review timer so that it is compulsory for the user to check is the email is correctly sent.

The types of the process 606 may be dependent on existing configuration of the email validation system 110. The incident database has been elaborated in disclosure of FIG. 5A and the scenario-based suggestion may be understood as cognitive learning operation disclosed in FIGS. 1-2, and for the sake of brevity, the concepts are not repeated here.

Subsequently, the AI model 608 may be employed on the processed data to obtain the output 610. The AI model 608 may include application of the dynamic Auto Generative Neural Network. Further, tools such as Natural Language Toolkit (NLTK) and Spacy Library may be used by the AI model 608. Further, as illustrated, the output 610 may include prediction of changes to configuration of the email account. Further, the output 610 along with the input 602 and the process 606 may be logged in the incident database for future references.

FIGS. 7A and 7B illustrate pictorial representation of predictions by the email validation system 110 stored in the audit log and the incident database, in accordance with embodiment of the present disclosure. For the sake of brevity, FIGS. 7A and 7B have been elaborated together.

As shown, incidents of email validation for different clients from different industries and type of service offerings are recorded in the database of the audit log. The database includes details related to initial configuration of the email account related to email validation, risk associated with the existing configuration, and predictions by the system 110 of changes to the configuration and misdirection of email. The database further includes details of changes made to the existing configuration and updated risk score and prediction of misdirection based on updated configuration.

Figure 8:
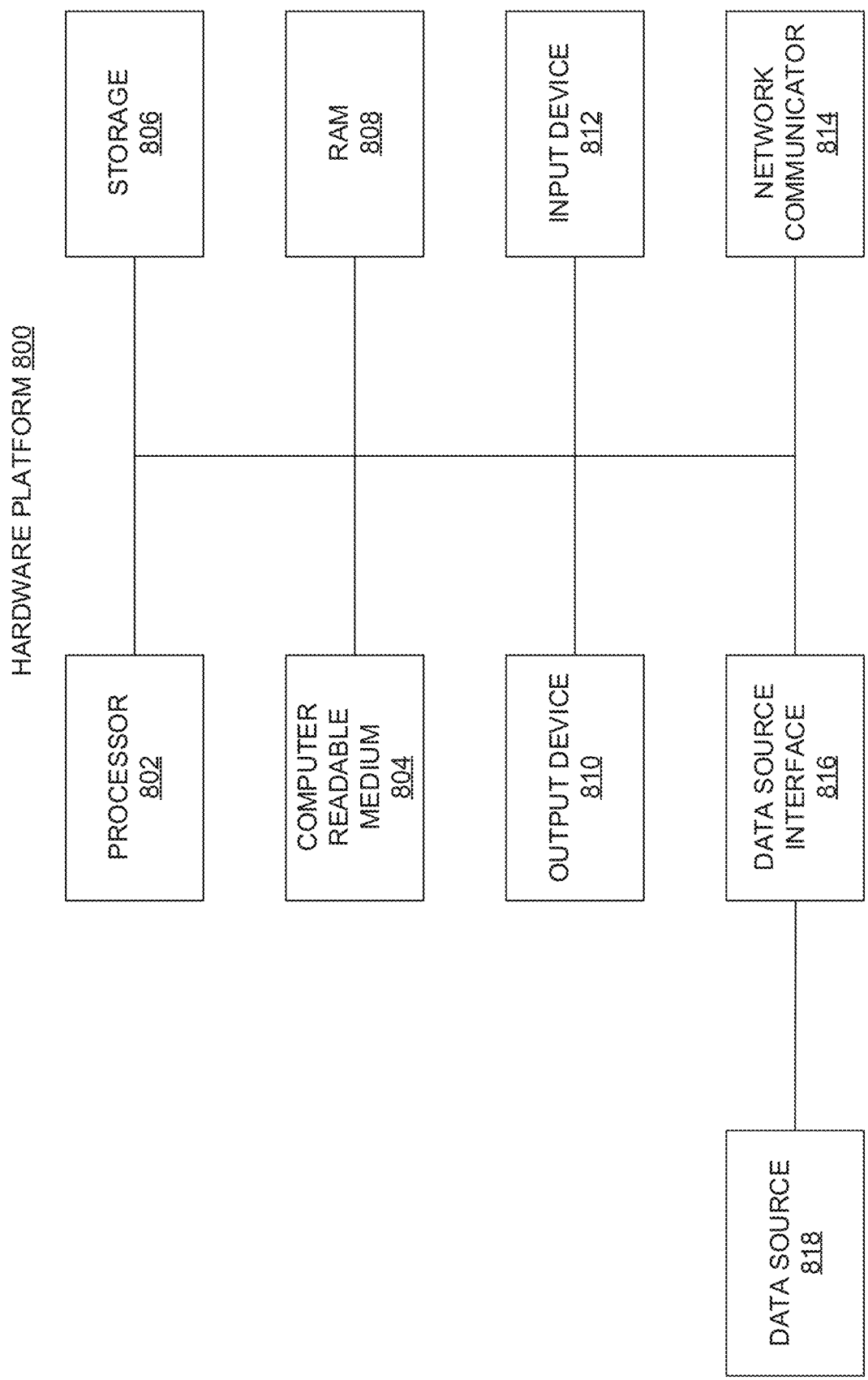
FIG. 8 illustrates a hardware platform for implementation of the system, according to an example embodiment of the present disclosure.

FIG. 8 illustrates a hardware platform 800 for implementation of the system 110, according to an example embodiment of the present disclosure. Particularly, computing machines such as but not limited to internal or external server clusters, quantum computers, desktops, laptops, smartphones, tablets and wearables which may be used to execute the system 110 or may have the structure of the hardware platform 800. The hardware platform 800 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over FIG. 8, the hardware platform 800 may be a computer system 800 that may be used with the examples described herein. The computer system 800 may represent a computational platform that includes components that may be in a server or another computer system. The computer system 800 may execute, by a processor (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 800 may include a processor 802 that executes software instructions or code stored on a non-transitory computer-readable storage medium 804 to perform methods of the present disclosure. The software code includes, for example, instructions to gather data and analyze data. In an example, the email dissector 130, the email analyzer 140, and the email validator 150 may be the software codes.

The instructions on the computer-readable storage medium 804 are read and stored the instructions in storage 806 or in random access memory (RAM) 808. The storage 806 provides a large space for keeping static data where at least some instructions could be stored for later execution. The stored instructions may be further compiled to generate other representations of the instructions and dynamically stored in the RAM 808. The processor 802 reads instructions from the RAM 808 and performs actions as instructed.

The computer system 800 further includes an output device 810 to provide at least some of the results of the execution as output including, but not limited to, visual information to users, such as email validation prompt. The output device 810 can include a display on computing devices and virtual reality glasses. For example, the display can be a mobile phone screen or a laptop screen. GUIs and/or text are presented as an output on the display screen. The computer system 800 further includes input device 812 to provide a user or another device with mechanisms for entering data and/or otherwise interact with the computer system 800. The input device 812 may include, for example, a keyboard, a keypad, a mouse, or a touchscreen. Each of these output devices 810 and input devices 812 could be joined by one or more additional peripherals. In an example, the output device 810 may be used to display the results of the email validation request 204.

A network communicator 814 may be provided to connect the computer system 800 to a network and in turn to other devices connected to the network including other clients, servers, data stores, and interfaces, for instance. A network communicator 814 may include, for example, a network adapter such as a LAN adapter or a wireless adapter. The computer system 800 includes a data source interface 816 to access data source 818. A data source is an information resource. As an example, audit logs may be a data source. Moreover, knowledge repositories and curated data may be other examples of data sources.

Figure 9:
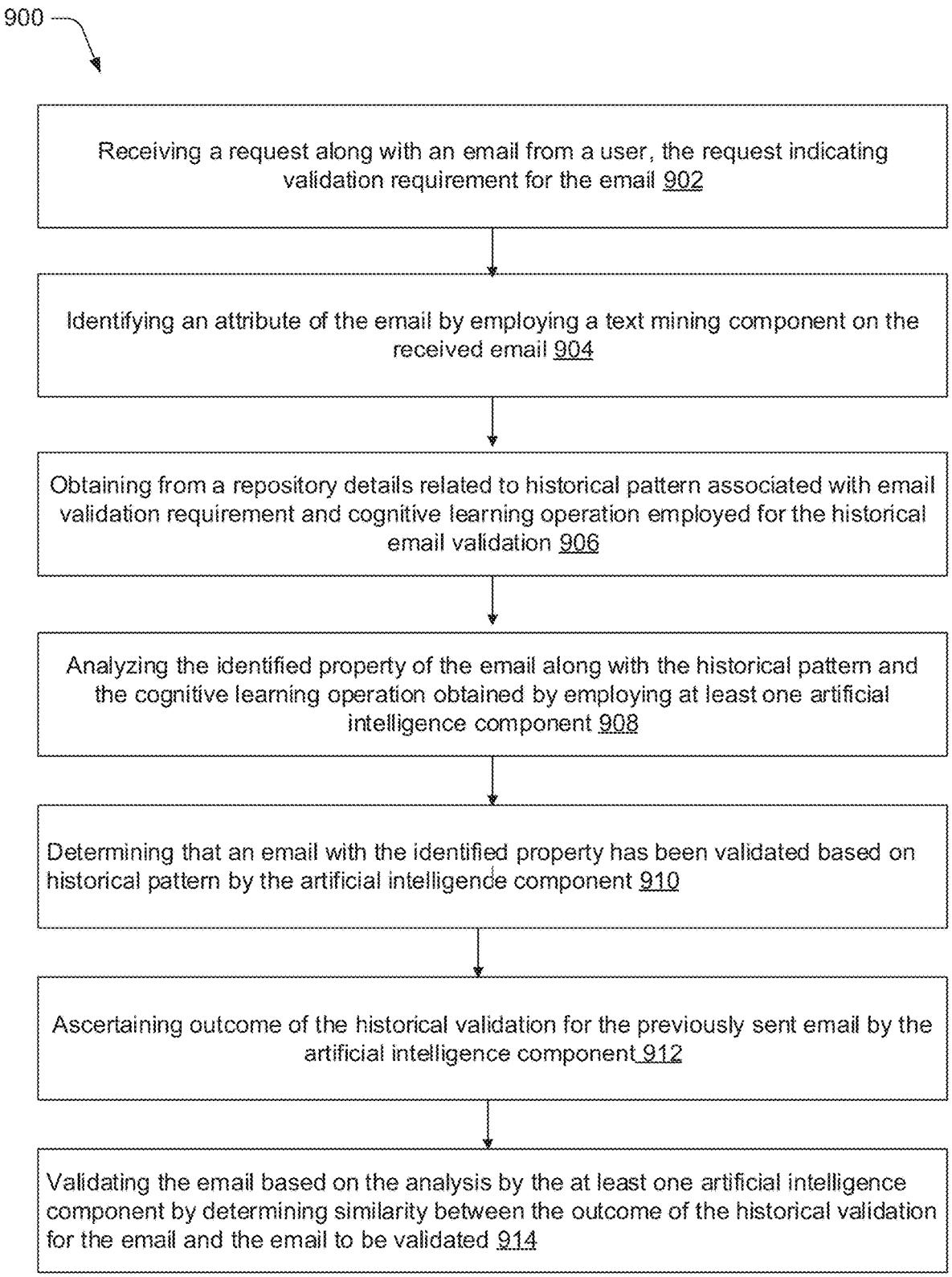
FIG. 9 illustrates a process flowchart for email validation using the email validation system, according to an example embodiment of the present disclosure.

FIG. 9 illustrates a process flowchart for email validation using the email validation system 110, according to an example embodiment of the present disclosure.

It should be understood that method steps are shown here for reference only and other combinations of the steps may be possible. Further, the method 900 may contain some steps in addition to the steps shown in FIG. 9. For the sake of brevity, construction and operational features of the system 110 which are explained in detail in the description of FIGS. 1-8 are not explained in detail in the description of FIG. 9. The method 900 may be performed by a component of the system 110, such as the processor 120, the email dissector 130, the email analyzer 140, and the email validator 150.

At block 902, the request along with the email from the user may be received. The request may be indicative of validation requirement for the email.

At block 904, an attribute of the email may be identified. The attribute may be identified by employing a text mining component on the received email. In an exemplary embodiment of the present disclosure, the attribute of the email may include sender of the email, receiver of the email, subject of the email, content in body of the email, type of attachment in the email, content in the attachment of the email, and existing configuration of email account associated with the received email.

In an implementation of the present disclosure, the identification of the attribute of the email may include identifying a source model of email provider of the email received and transforming the identified source model to an email model in a predefined format. Further, a text mining component may be employed to the email model in the predefined format to identify the attribute from the email model. The text mining component may be implemented as Natural Language Processing.

At block 906, details related to historical pattern associated with email validation requirement and cognitive learning operation employed for the historical email validation are obtained from a repository. The historical pattern and the cognitive learning operation may include data associated with Email validation tool (EVT) repository, misdirected email incidents for existing configuration of the email account and audit logs indicative of usage pattern of the existing email account user. Further, the data for the cognitive learning operation may be indicative of AI component employed for the existing configuration of the email account.

At block 908, the identified property of the email is analyzed along with the historical pattern and the cognitive learning operation obtained by employing an AI component.

At block 910, it is determined if an email with the identified property has been validated based on historical pattern by the AI component.

At block 912, outcome of the historical validation for the previously sent email is ascertained by the AI component.

At block 914, the email is validated based on the analysis by the AI component by determining similarity between the outcome of the historical validation for the email and the email to be validated.

In accordance with various embodiments of the present disclosure, the method 900 may further include predicting change to the existing configuration of the email account and predicting misdirection incident for emails associated with the associated with the existing configuration, upon completion of email validation by providing a prompt to the user with changes to the configuration and logging the email validation for subsequent validation scenarios. The prediction of the change to the existing configuration and misdirection incident is by employing a dynamic Auto Generative Neural Network that compares the existing configuration with the historical configuration and the misdirection incidents for the prediction.

In an example, the method 900 may be practiced using a non-transitory computer-readable medium. In an example, the method 900 may be a computer-implemented method.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
    a processor;
    an email dissector, coupled to the processor, the email dissector to:
        receive a request with an email from a user, the request indicating a validation requirement for the email; and
        identify an attribute of the email by employing a text mining component on the email; and
    an email analyzer, coupled to the processor, the email analyzer to:
        obtain details from a repository related to a historical pattern associated with an email validation requirement and a cognitive learning operation employed for historical email validation;
        analyze the attribute of the email along with the historical pattern and the cognitive learning operation obtained by employing an artificial intelligence (AI) component;
        determine that a previously sent email with the attribute has been validated based on historical pattern by the AI component in a previous email validation instance;
        ascertain an outcome of the historical email validation for the previously sent email by the AI component; and
    an email validator, coupled to the processor, the email validator to:
        validate the email by determining a similarity between the outcome of the historical validation for the previously sent email and the email to be validated.

2. The system as claimed in claim 1, wherein the attribute of the email comprises: a sender of the email, a receiver of the email, a subject of the email, a content in body of the email, an attachment type in the email, a content in an attachment of the email, and an existing configuration of an email account associated with the email.

3. The system as claimed in claim 1, wherein, to identify the attribute of the email, the email dissector is to:
    identify a source model of an email provider of the email received, wherein the source model is associated with a format of email provided by the email provider;
    transform the source model to an email model in a predefined format associated with the email analyzer, wherein the predefined format is agnostic to a platform associated with the email; and
    employ the text mining component on the email model in the predefined format to identify the attribute from the email model, wherein the text mining component is implemented using Natural Language Processing.

4. The system as claimed in claim 1, wherein the historical pattern comprises data associated with at least one of an Email Validation Tool (EVT) repository, a misdirected email incident for an existing configuration of an email account, and audit logs indicative of a usage pattern of the existing email account user.

5. The system as claimed in claim 1, wherein data of the cognitive learning operation is indicative of a type of the AI component employed for an existing configuration of an email account associated with the email.

6. The system as claimed in claim 1, wherein the email validator is to, upon completion of email validation, predict a change to an existing configuration of an email account linked with the email, and predict a misdirection incident for the email with the existing configuration, wherein the email validator is to provide a prompt to the user with changes to the existing configuration and logging the email validation for subsequent validation scenarios.

7. The system as claimed in claim 6, wherein the email validator is to employ a dynamic Auto Generative Neural Network to predict the change to the existing configuration and the misdirection incident, the dynamic Auto Generative Neural Network to compare the existing configuration with a historical configuration and the misdirection incident to predict.

8. A method comprising:
    receiving, by a processor, a request with an email from a user, the request indicating a validation requirement for the email;
    identifying, by the processor, an attribute of the email by employing a text mining component on the email;
    obtaining, by the processor, from a repository details related to historical pattern associated with an email validation requirement and a cognitive learning operation employed for historical email validation;
    analyzing, by the processor, the attribute of the email along with the historical pattern and the cognitive learning operation obtained by employing an artificial intelligence (AI) component;
    determining, by the processor, that a previously sent email with the attribute has been validated based on historical pattern by the AI component in a previous email validation instance;

ascertaining, by the processor, an outcome of a historical validation for the previously sent email by the AI component; and validating, by the processor, the email by determining a similarity between the outcome of the historical validation for the previously sent email and the email to be validated.

9. The method as claimed in claim 8, wherein the attribute of the email comprises a sender of the email, a receiver of the email, a subject of the email, a content in body of the email, an attachment type in the email, a content in an attachment of the email, and an existing configuration of an email account associated with the email.

10. The method as claimed in claim 8, wherein the identifying the attribute of the email further comprises:
identifying a source model of an email provider of the email received, wherein the source model is associated with a format of email provided by the email provider;
transforming the source model to an email model in a predefined format, wherein the predefined format is JavaScript Object Notation (JSON) and is agnostic to a platform associated with the email; and
employing the text mining component to the email model in the predefined format to identify the attribute from the email model, wherein the text mining component is implemented using Natural Language Processing.

11. The method as claimed in claim 8, wherein the historical pattern comprises data associated with at least one of an Email Validation Tool (EVT) repository, a misdirected email incident for an existing configuration of an email account, and audit logs indicative of a usage pattern of the existing email account user.

12. The method as claimed in claim 8, wherein data of the cognitive learning operation is indicative of an AI component employed for an existing configuration of an email account linked with the email.

13. The method as claimed in claim 8, further comprising predicting a change to an existing configuration of an email account linked with the email and predicting a misdirection incident for the email with an existing configuration, upon completion of the email validation, by providing a prompt to the user with changes to the existing configuration and logging the email validation for subsequent validation scenarios.

14. The method as claimed in claim 13, wherein the prediction of the change to an existing configuration and the misdirection incident involves employing a dynamic Auto Generative Neural Network that compares the existing configuration with a historical configuration and the misdirection incident for the prediction.

15. A non-transitory computer readable medium including machine readable instructions that are executable by a processor to:
receive a request with an email from a user, the request indicating a validation requirement for the email;
identify an attribute of the email by employing a text mining component on the email;
obtain details from a repository related to historical pattern associated with an email validation requirement and a cognitive learning operation employed for historical email validation;
analyze the attribute of the email along with the historical pattern and the cognitive learning operation obtained by employing an artificial intelligence (AI) component;
determine that a previously sent email with the attribute has been validated based on historical pattern by the AI component in a previous email validation instance;
ascertain an outcome of a historical validation for the previously sent email by the AI component; and
validate the email by determining a similarity between the outcome of the historical validation for the previously sent email and the email to be validated.

16. The non-transitory computer-readable medium as claimed in claim 15, wherein the attribute of the email comprises: sender of the email, a receiver of the email, a subject of the email, a content in body of the email, an attachment type in the email, a content in an attachment of the email, and an existing configuration of an email account associated with the email.

17. The non-transitory computer-readable medium as claimed in claim 15, further comprising machine readable instructions to:
identify a source model of an email provider of the email received, wherein the source model is associated with a format of email provided by the email provider;
transform the source model to an email model in a predefined format, wherein the predefined format is agnostic to a platform associated with the email; and
employ the text mining component to the email model in the predefined format to identify the attribute from the email model, wherein the text mining component is implemented using Natural Language Processing.

18. The non-transitory computer-readable medium as claimed in claim 15, wherein the historical pattern comprises data associated with at least one of an Email Validation Tool (EVT) repository, a misdirected email incident for an existing configuration of an email account, and audit logs indicative of a usage pattern of the existing email account user.

19. The non-transitory computer-readable medium as claimed in claim 15, wherein data for the cognitive learning operation is indicative of an AI component employed for an existing configuration of an email account linked with the email.

20. The non-transitory computer-readable medium as claimed in claim 15, further comprising machine readable instructions to predict a change to an existing configuration of an email account linked with the email and predict a misdirection incident for the email with the existing configuration by providing a prompt to the user with changes to the existing configuration and logging the email validation for subsequent validation scenarios.

* * * * *